INVENTOR.
CHARLES H. CREASSER

INVENTOR.
CHARLES H. CREASSER

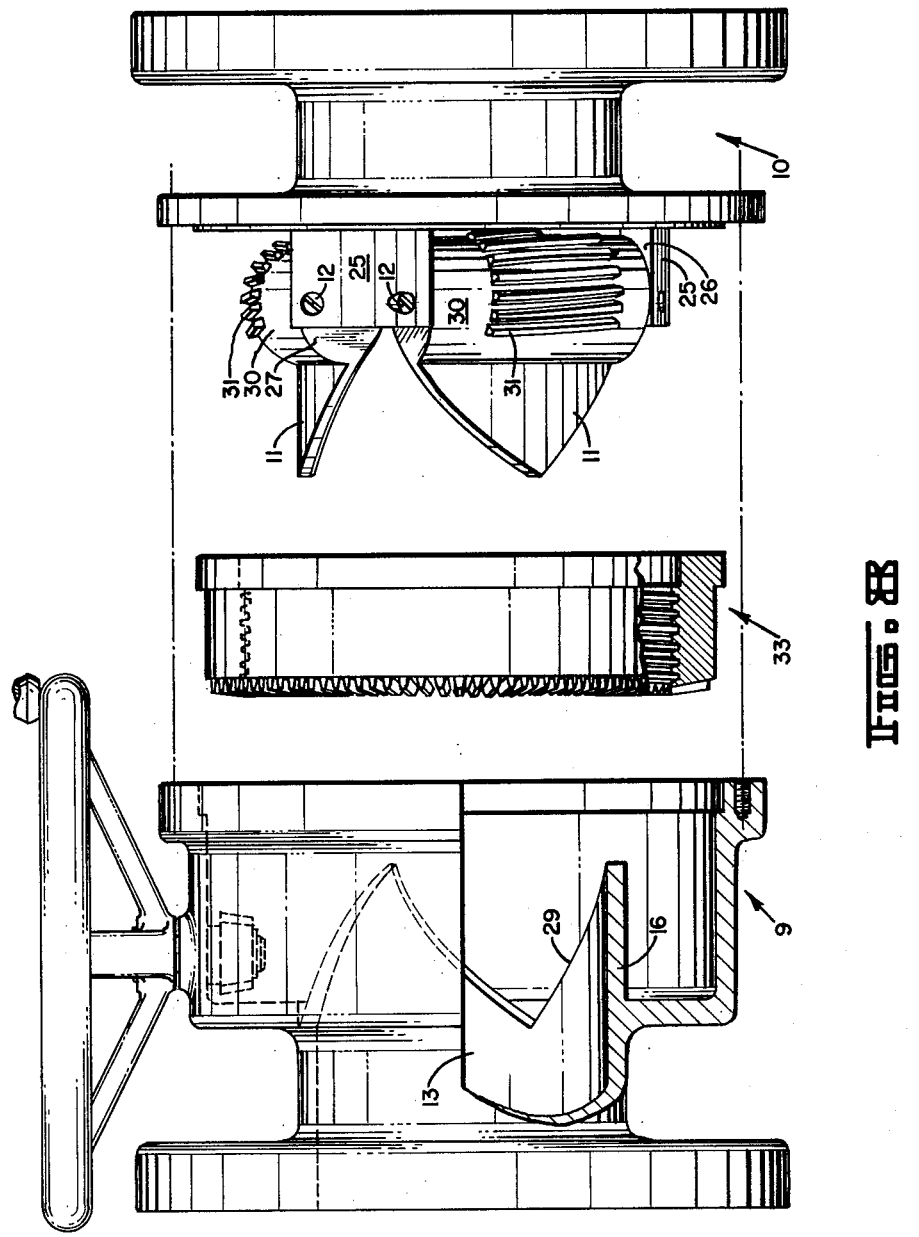

United States Patent Office 3,136,525
Patented June 9, 1964

1

3,136,525
CENTER FLOW IN-LINE VALVE
Charles H. Creasser, Scarsdale, N.Y., assignor to Walworth Company, New York, N.Y., a corporation of Massachusetts
Filed Feb. 19, 1962, Ser. No. 174,037
3 Claims. (Cl. 251—212)

The invention relates to a new type of valve which is unlike conventional gate valves and is also unlike the so-called in-line valves, yet combines important advantages of each of these two older types.

The gate valve, when fully opened, has the cardinal advantage that it leaves the flow passage free from obstruction and with substantially unbroken cylindrical inner walls extending from end to end of the valve. But this valve is poorly adapted to throttling action and it is large and cumbersome due to the space needed to accommodate the gate when retracted laterally of the flow passage.

The "in-line" valve is far more compact and is a good valve for throttling, but this valve whether fully or partly open does not have an unobstructed flow passage. Instead, it conventionally has a needle positioned right in the center of the flow passage so that the stream is forced to divide and flow around the sides of an obstructing island. If considered in terms of linear flow through the valve, the expression "in-line" is perhaps something of a misnomer because the flow is not truly linear.

I have found a way of combining the free, unobstructed open flow characteristics of the gate valve with the compactness and throttling feasibility of the in-line valve. This I have accomplished in a valve which also has a capability lacking in both of these older types, namely that of providing true center flow during all positions of adjustment from full open position to the final throttling adjustment, i.e., until flow ceases altogether. In full open position the passage can be made as smooth and unobstructed as in a gate valve. In other positions up to fully closed, the main stream continues to flow right through the center of the passage.

These and other advantages are obtainable through the use of my invention according to which I have devised a gate assembly comprising a number of radially divided segments pivotally mounted around the perimeter of the fluid passage in the valve. These segments can be swung outwardly to spread them into the cylindrical form of the fluid passage, or inwardly to bring them together along their edges and close the passage. In my preferred construction these segments are petal-shaped and, when spread open, nest into similarly shaped recesses in the cylindrical walls of the fluid passage. Also in this preferred construction, the inner surfaces of the open petal-shaped members are made to conform to the cylindrical walls of the passage. Thus cavitation can be reduced to an absolute minimum.

With reference to the accompanying drawings, I shall now describe the best mode known to me for carrying out my invention.

2

FIG. 8 is a partially exploded view of the valve, showing the parts in side elevation, some of them partly broken away in central vertical cross section.

Figure 1:
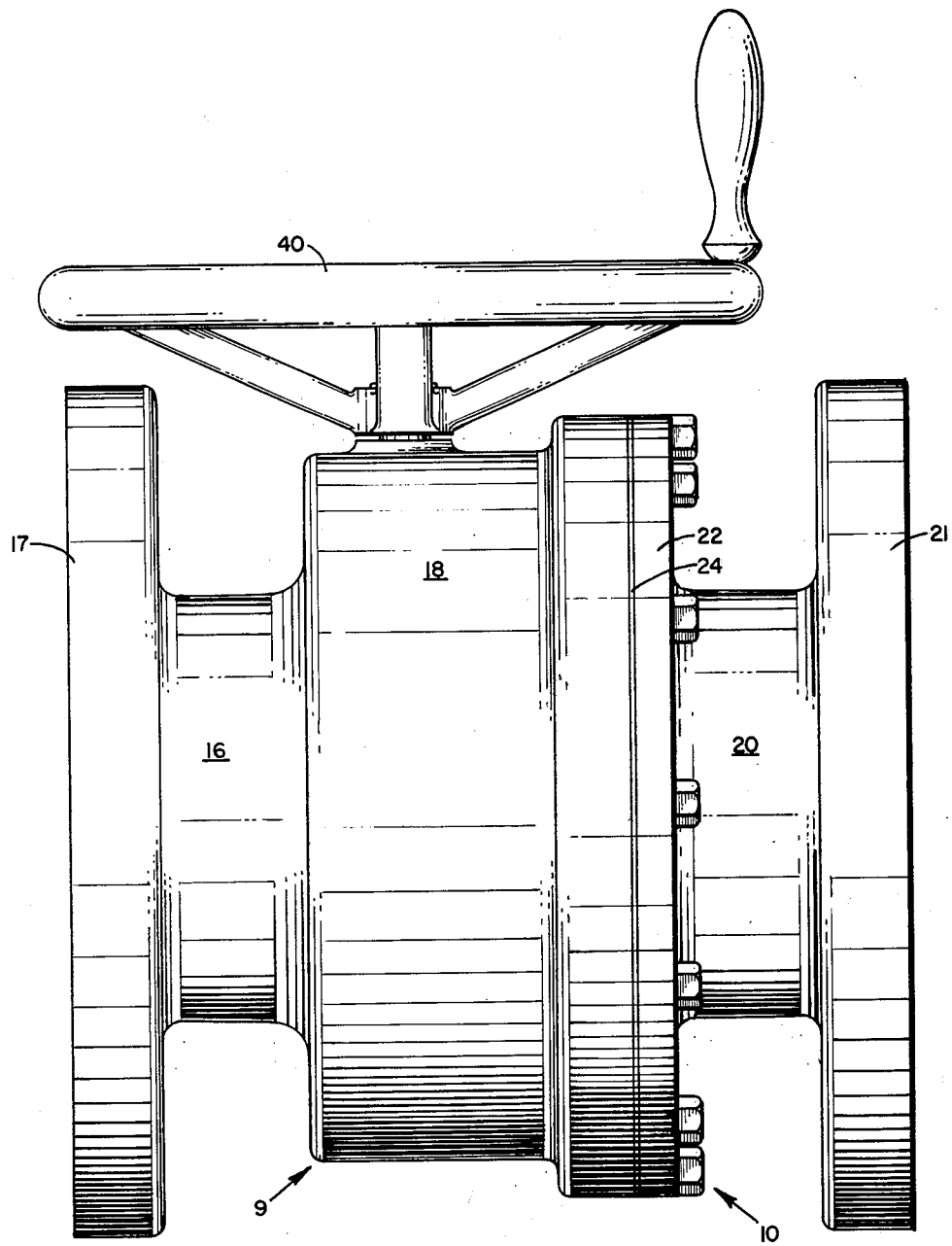
FIG. 1 is a side elevational view of my valve.
Figure 2:
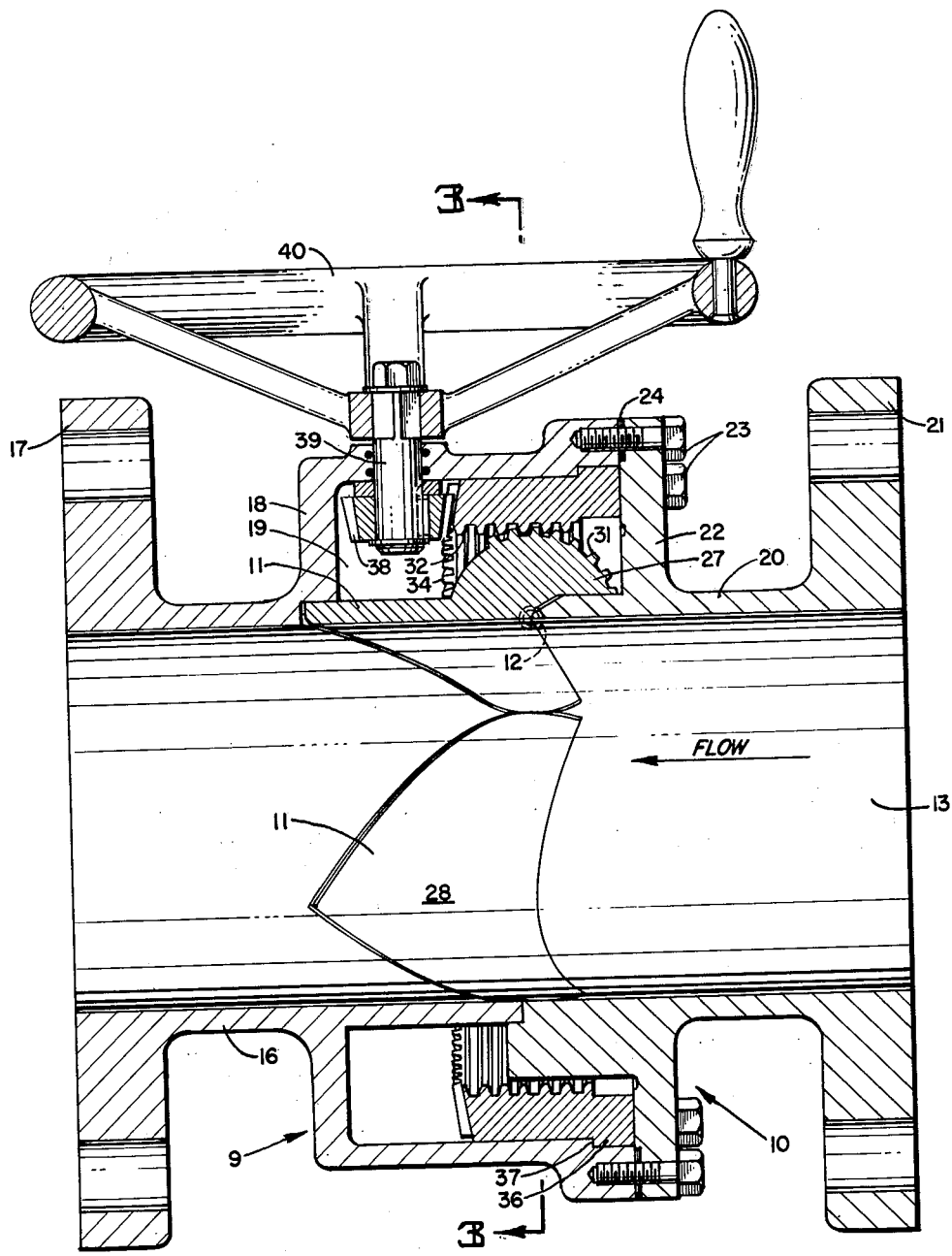
FIG. 2 is a vertical longitudinal sectional view of the same, showing the gates fully open.
Figure 3:
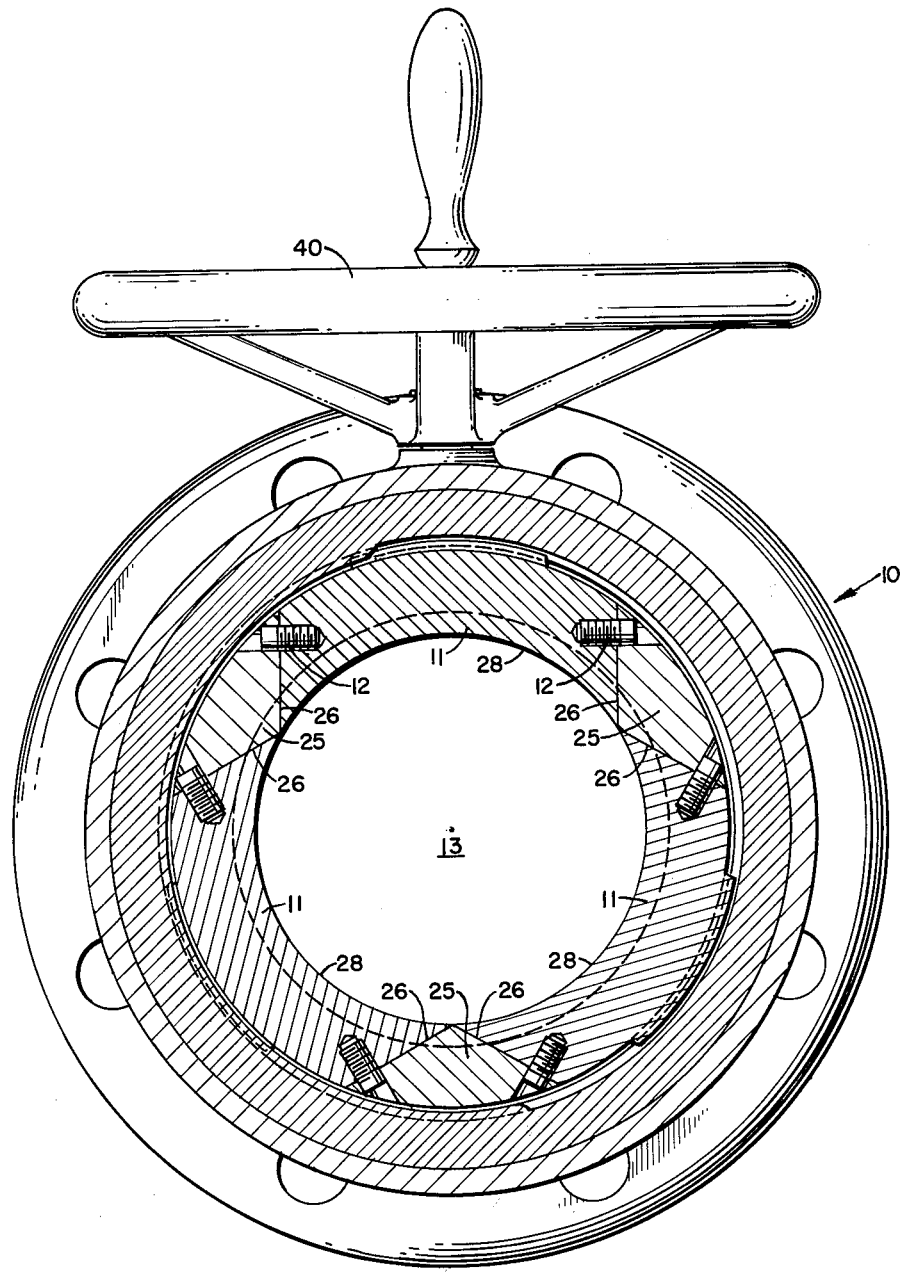
FIG. 3 is a vertical transverse sectional view taken on line 3—3 of FIG. 2.
Figure 6:
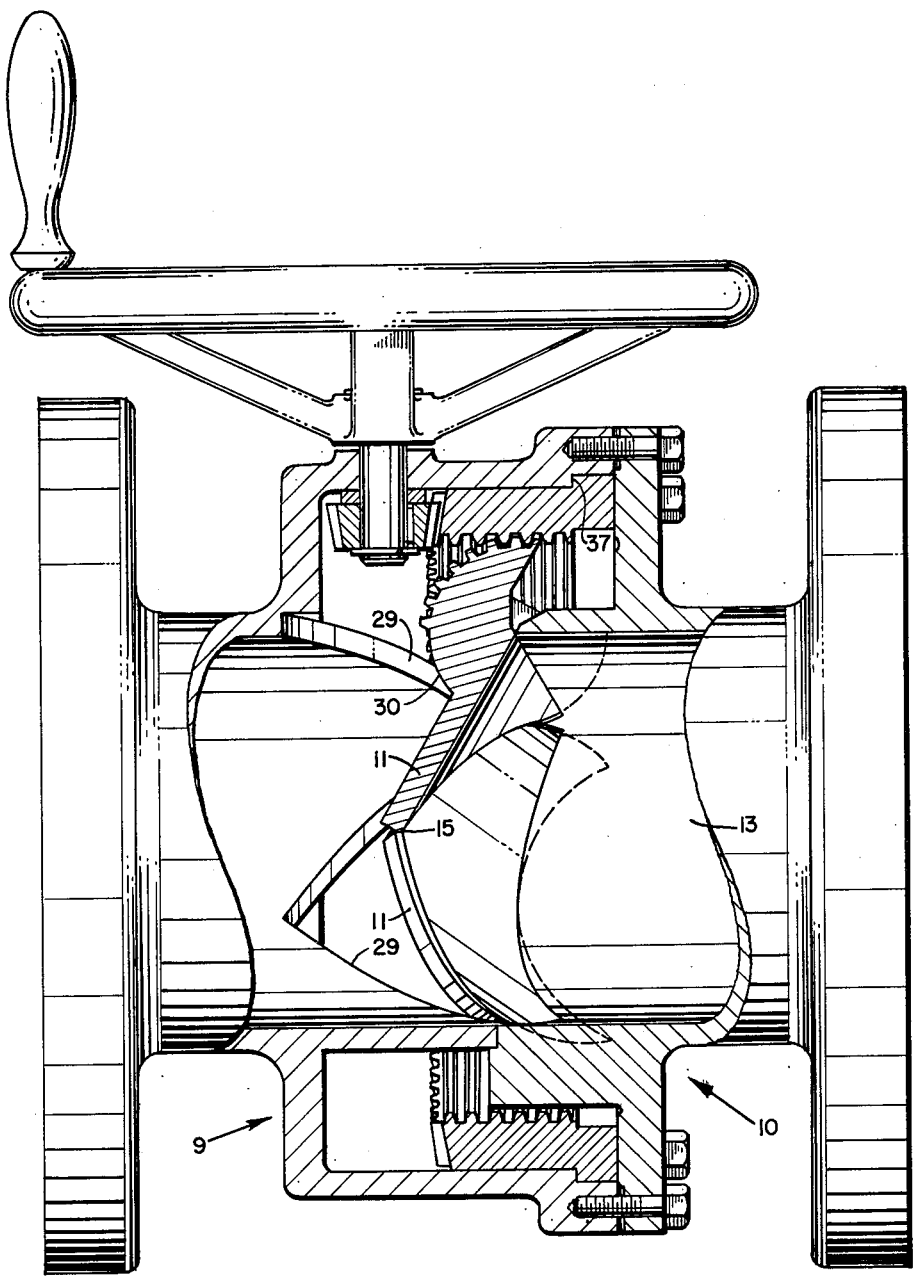
FIG. 6 is a view similar to FIGS. 2 and 4, showing the gates fully closed.
Figure 7:
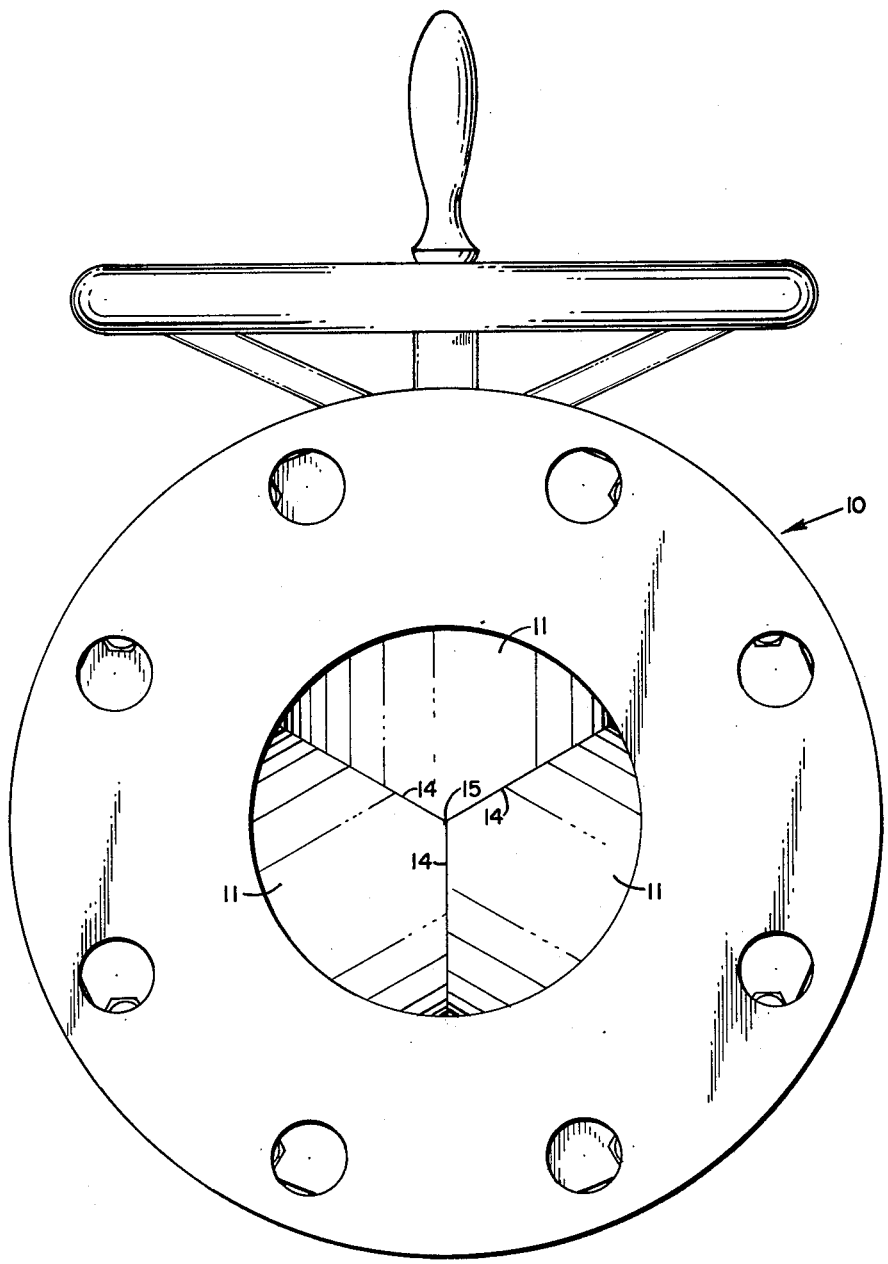
FIG. 7 is a view similar to FIG. 5, showing the gates fully closed, being an end elevational view of FIG. 6.

As represented in the preferred construction here shown, my invention consists of a valve including a body which conveniently is made in two parts as by a left hand body member or valve housing 9 and a right hand body member 10; and further including a plurality of petal-shaped gate members 11 pivotally mounted, as by screws or studs 12, around the perimeter of the fluid passage 13 which extends through the valve body. The gate members in their opened position, FIGS. 2 and 3, are disposed around the perimeter of fluid passage 13, and in their closed position, FIGS. 6 and 7, are disposed to come together along lines 14 merging at substantially the center 15 of the fluid passage. The valve also includes means for swinging the gate members around their pivotal mountings to open and close the valve as will be described more fully below.

Left hand body member 9 may be formed as a metal casting having a tubular section 16, a suitable coupling flange 17 for attachment to the flange of a pipe or coupling member, and an enlarged annular section 18 forming a housing providing a chamber 19 to receive the gate operating mechanism. Similarly, the right hand body member 10 may be formed as a metal casting having a tubular section 20, coupling flange 21, and an annular flange 22 to close the chamber 19. The two body members are fastened together by suitable means such as the series of machine screws 23 with a sealing gasket 24 clamped between the mating surfaces of the body members. Body member 10 is formed with axially projecting studs 25, FIGS. 3 and 8, the angularly disposed surfaces 26 of which are disposed normal to the axes about which the respective gates pivot, these axes being the centerlines which pass through the respective pairs of studs 12 which form the pivots for the gates. The base 27 of each gate 11 is arcuate in form as viewed in FIG. 2, and is of a width to be received freely between an opposed pair of the surfaces 26. From its base 27, the gate tapers to a point as shown in FIG. 8, assuming a form which I have described as being petal-shaped. This part of the gate has an arched inner surface 28, FIGS. 2 and 3, preferably cylindrical, but in any case substantially conforming to the flow lines of fluid passage 13. Tubular section 16 of body member 9 is formed with petal-shaped recesses 29, FIGS. 6 and 8, to receive the gate members in their opened position whereby the gates are received in recesses in the walls of fluid passage 13. The combination of petal-shaped gates, petal-shaped recesses and cylindrical inner surfaces of the gates makes it possible to open the gates into a position substantially flush with the walls of the fluid passage thereby reducing cavitation to a minimum. Also the gates will close together centrally of the passage, so that fluid can flow directly through the very center of the passage during all positions of adjustment of the valve from full open position to the final throttling adjustment which immediately precedes movement of the gates into fully closed position. In their fully closed position, the gates meet along radial lines 14 which intersect in the central portion 15 of the fluid passage.

Figure 4:
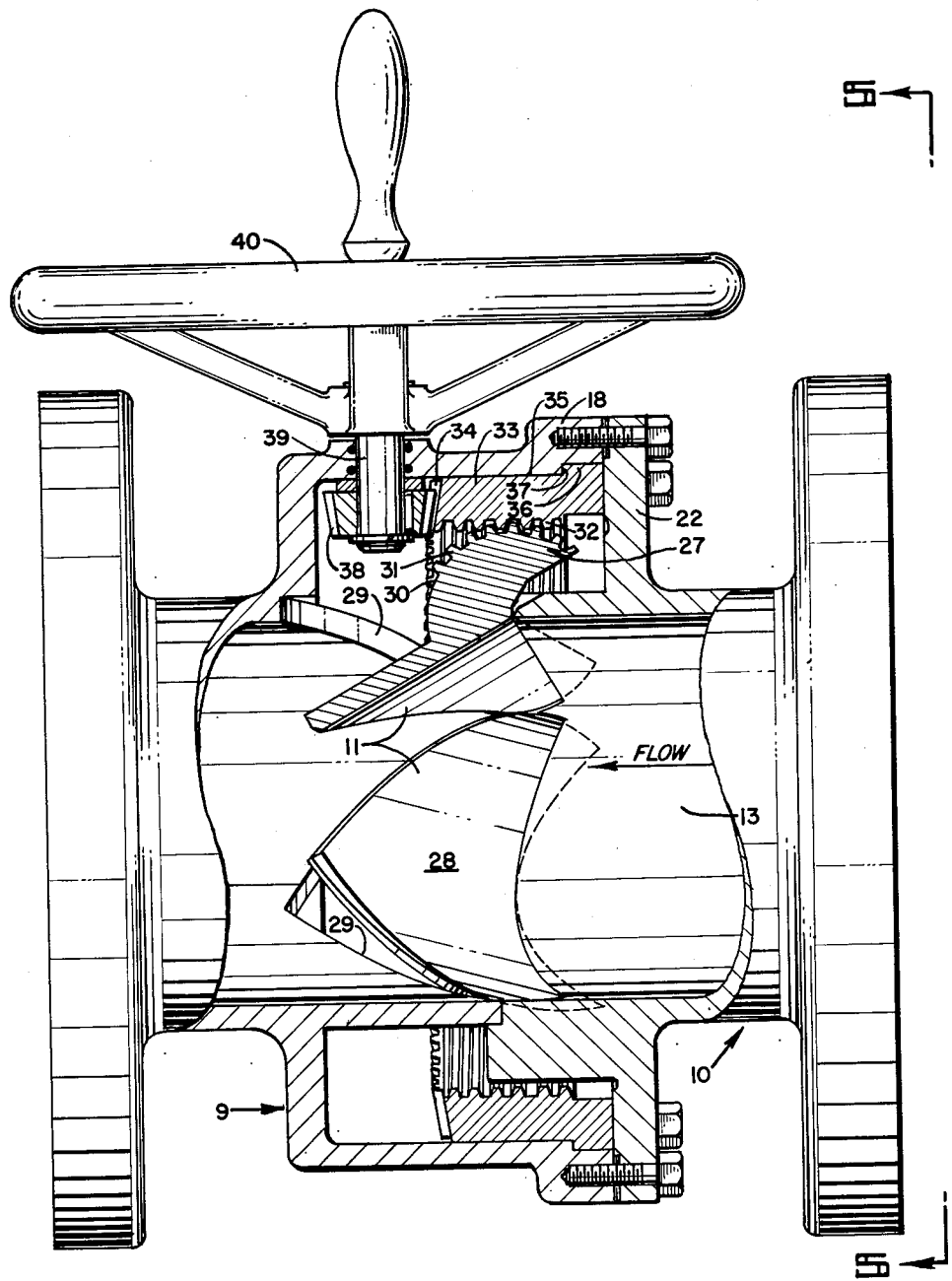
FIG. 4 is a view similar to FIG. 2, showing the gates partly open.
Figure 5:
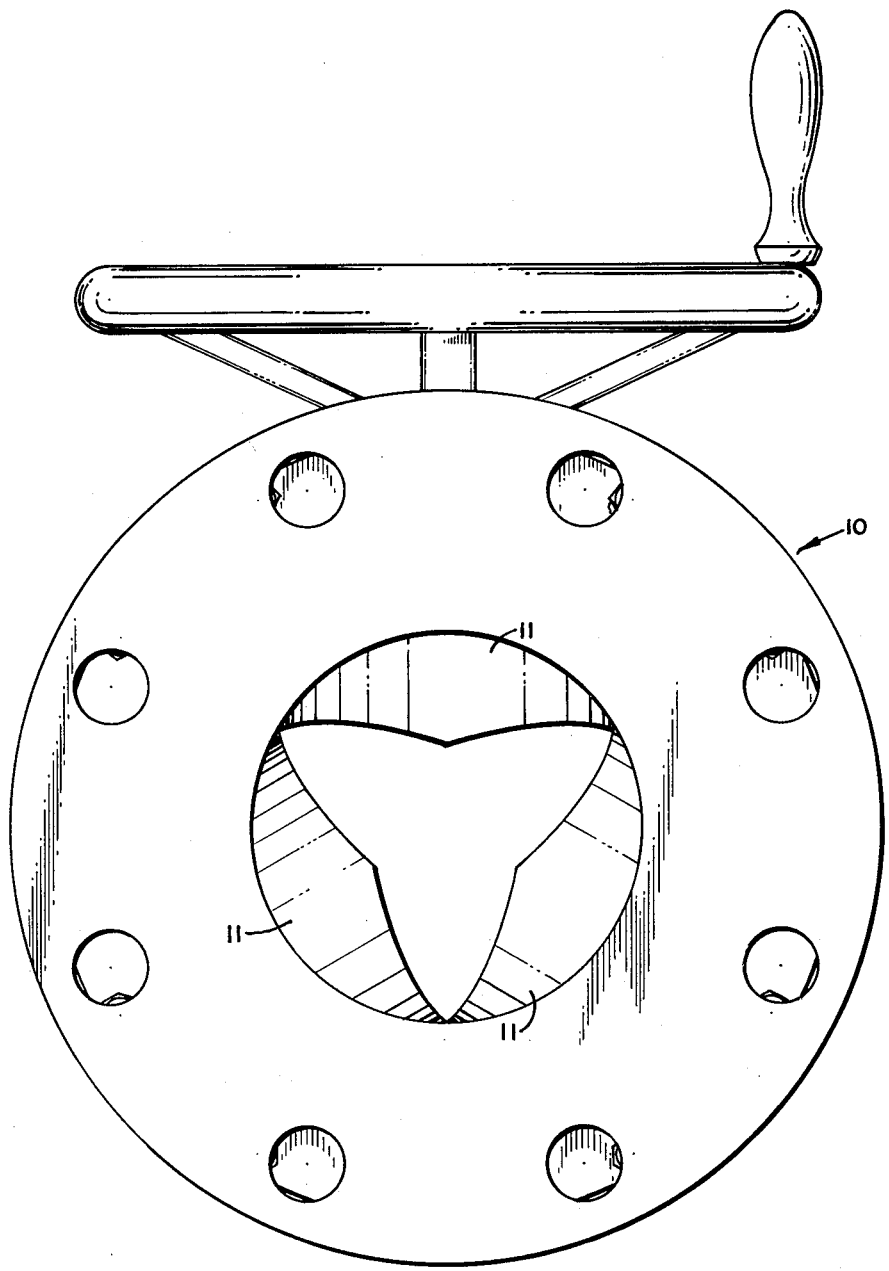
FIG. 5 is an end elevational view taken as indicated at 5—5 in FIG. 4.

The gates may be operated through a rotating sleeve, with or without the use of a handwheel. I have here illustrated a form of mechanism which includes a geared drive from a handwheel, but it will be understood that other types of operating means for actuation by wrenches or otherwise may be employed as desired. The aforesaid bases 27 of the gates, when adapted for use in conjunction with the type of operating device here shown, are formed with surfaces 30 which have a compound curvature. In sections normal to the axis of pivoting of the gates these surfaces 30 are arcuate, FIG. 2, with the pivot axis a center. Viewed from a direction at right angles to such sections, surfaces 30 are curved around the center of the flow passage. Gear teeth 31 are formed on these surfaces, developed to mesh with the threads 32 formed on the interior of a rotary operating sleeve 33 with associated beveled ring gear 34 rotatably received within the cylindrical bearing 35 of annular section 18 of housing 9. Sleeve 33 is formed with a collar 36 for end thrust bearing against the shoulder 37 of a counterbore in section 18. End thrust in the other direction is against the inside of flange 22 of body member 10. Ring gear 34 meshes with beveled pinion 38 fixed to a shaft 39 extending through housing section 18 and operated by a handwheel 40. Rotation of the handwheel in one direction produces the gate action pictured successively in FIGS. 2, 4 and 6 (or FIGS. 3, 5 and 7); or the reverse of this upon opposite rotation.

The manner of assembling or disassembling the valve will be understood from FIG. 8. At the left hand we see a sub-assembly of one body member with the handwheel, shaft and pinion; at the right hand a sub-assembly of the other body member with the gates, the pivot studs being screwed into place after the gates are aligned with their respective pivot axes. Next the rotary operating sleeve is threaded onto the backs of the gates and spun home. Finally this intermediate assembly is slid into place in the left hand sub-assembly and the whole assembly is fastened by the flange screws.

The direction of flow through the valve may in some cases be the reverse of that shown by the arrows, depending upon whether it is desired that the fluid pressure assist in the opening action or on the other hand to assist in the closing action of the valve. For smoothest throttling action, flow should be in the direction here indicated.

The terms and expressions which I have employed are used in a descriptive and not a limiting sense, and I have no intention of excluding equivalents of the invention described and claimed.

I claim:

1. In a valve for controlling the flow of fluid in a generally cylindrical passage, a gate assembly which comprises at least three radially divided segments pivotally mounted around the perimeter of said passage, and means for swinging said segments in unison to spread them out into the cylindrical form of the passage and alternately bring them together along the lines of radial division, each of said segments including a toothed sector concentric with its pivotal mounting, said means for swinging the segments including said toothed sectors and a rotary operating sleeve concentric with said passage, said rotary operating sleeve having threads meshing with the teeth of said toothed sectors so that rotation of the rotary operating sleeve produces the aforesaid swinging of the segments.

2. In a valve for controlling the flow of fluid in a generally cylindrical passage, a gate assembly which comprises at least three radially divided segments pivotally mounted around the perimeter of said passage, and means for swinging said segments in unison to spread them out into the cylindrical form of the passage and alternately bring them together along the lines of radial division, each of said segments including a sector having an arcuate surface which as viewed in a section normal to the pivot axis of its pivotal mounting is arcuate with the pivot axis as a center, said arcuate surface as viewed from a direction at right angles to said section being curved around the center of said passage, said surface of the sector thus having a compound curvature, said surface being provided with threads, and said means for swinging the segments including said threads and a rotary operating sleeve concentric with said passage, said rotary operating sleeve having threads meshing with the threads of said arcuate surfaces of the sectors so that rotation of the rotary operating sleeve produces the aforesaid swinging of the segments.

3. A valve having a gate assembly according to claim 1 in which said means for swinging the segments also includes a ring gear associated with said rotary operative sleeve, a pinion meshing with said ring gear and means for operating the pinion to produce rotation of said rotary operating sleeve.

References Cited in the file of this patent

UNITED STATES PATENTS

| | | |
|---|---|---|
| 1,130,609 | Jones | Mar. 2, 1915 |
| 2,094,707 | Jones | Oct. 5, 1937 |
| 2,956,582 | Pranter | Oct. 18, 1960 |